US012266388B1

(12) United States Patent
Furuhashi et al.

(10) Patent No.: US 12,266,388 B1
(45) Date of Patent: Apr. 1, 2025

(54) MAGNETIC RECORDING AND REPRODUCING DEVICE AND ADJUSTMENT METHOD OF THE SAME

(71) Applicants: Kabushiki Kaisha Toshiba, Tokyo (JP); Toshiba Electronic Devices & Storage Corporation, Tokyo (JP)

(72) Inventors: Takao Furuhashi, Kanagawa (JP); Kaori Kimura, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/594,478

(22) Filed: Mar. 4, 2024

(30) Foreign Application Priority Data

Sep. 22, 2023 (JP) .................................. 2023-158269

(51) Int. Cl.
| | | |
|---|---|---|
| *G11B 5/60* | (2006.01) | |
| *G11B 5/012* | (2006.01) | |
| *G11B 5/02* | (2006.01) | |
| *G11B 5/455* | (2006.01) | |
| *G11B 5/00* | (2006.01) | |

(52) U.S. Cl.
CPC ............. *G11B 5/607* (2013.01); *G11B 5/012* (2013.01); *G11B 5/02* (2013.01); *G11B 5/455* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 9,257,146 B1 * | 2/2016 | Wang | G11B 20/10268 |
| 9,502,061 B1 * | 11/2016 | Zhu | G11B 20/10453 |
| 9,536,559 B1 * | 1/2017 | Cordle | G11B 20/10481 |
| 9,601,140 B1 | 3/2017 | Rajauria | |
| 10,395,683 B2 | 8/2019 | Rausch et al. | |
| 10,410,660 B1 | 9/2019 | Hutchinson et al. | |
| 10,950,266 B1 | 3/2021 | Rajauria et al. | |
| 11,735,217 B2 | 8/2023 | Yuan et al. | |

(Continued)

FOREIGN PATENT DOCUMENTS

JP     2022-173700 A     11/2022

OTHER PUBLICATIONS

U.S. Appl. No. 18/596,531, filed Mar. 5, 2024.

*Primary Examiner* — Peter Vincent Agustin
(74) *Attorney, Agent, or Firm* — Kim & Stewart LLP

(57) ABSTRACT

According to one embodiment, a method of adjusting a magnetic recording and reproducing device is a method of adjusting a magnetic recording and reproducing device incorporating a heat-assisted magnetic recording head and a magnetic disk, and the method includes performing a first write operation at a first position on a recording surface, measuring a first error rate at a second position different in radial position from the first position, performing a second write operation and then measuring a second error rate, obtaining a first difference between the first error rate and the second error rate, measuring a third error rate at the first position, performing a third write operation and then measuring a fourth error rate, calculating a second difference between the third error rate and the fourth error rate, comparing the first difference with the second difference and determining a change in flying height.

18 Claims, 12 Drawing Sheets

(56) References Cited

U.S. PATENT DOCUMENTS

| | | | |
|---|---|---|---|
| 11,735,221 B2* | 8/2023 | Tomoda | G11B 5/02 |
| | | | 360/78.04 |
| 2004/0008594 A1* | 1/2004 | Tokita | G11B 7/1267 |
| 2004/0027709 A1* | 2/2004 | Hamaguchi | G11B 5/6005 |
| | | | 360/59 |
| 2004/0044944 A1* | 3/2004 | Song | G11B 5/3136 |
| | | | 714/769 |
| 2007/0035866 A1* | 2/2007 | Wu | G06F 1/3221 |
| | | | 360/29 |
| 2007/0188908 A1* | 8/2007 | Kurita | G11B 19/26 |
| 2010/0328800 A1* | 12/2010 | Sakai | G11B 20/10009 |
| 2012/0229928 A1* | 9/2012 | Sakai | G11B 5/6029 |
| 2016/0240216 A1* | 8/2016 | Ma | G11B 7/1263 |
| 2017/0221511 A1 | 8/2017 | Dai et al. | |
| 2019/0019531 A1 | 1/2019 | Rausch et al. | |
| 2021/0407543 A1 | 12/2021 | Yuan et al. | |
| 2022/0358962 A1 | 11/2022 | Fukushima et al. | |

\* cited by examiner

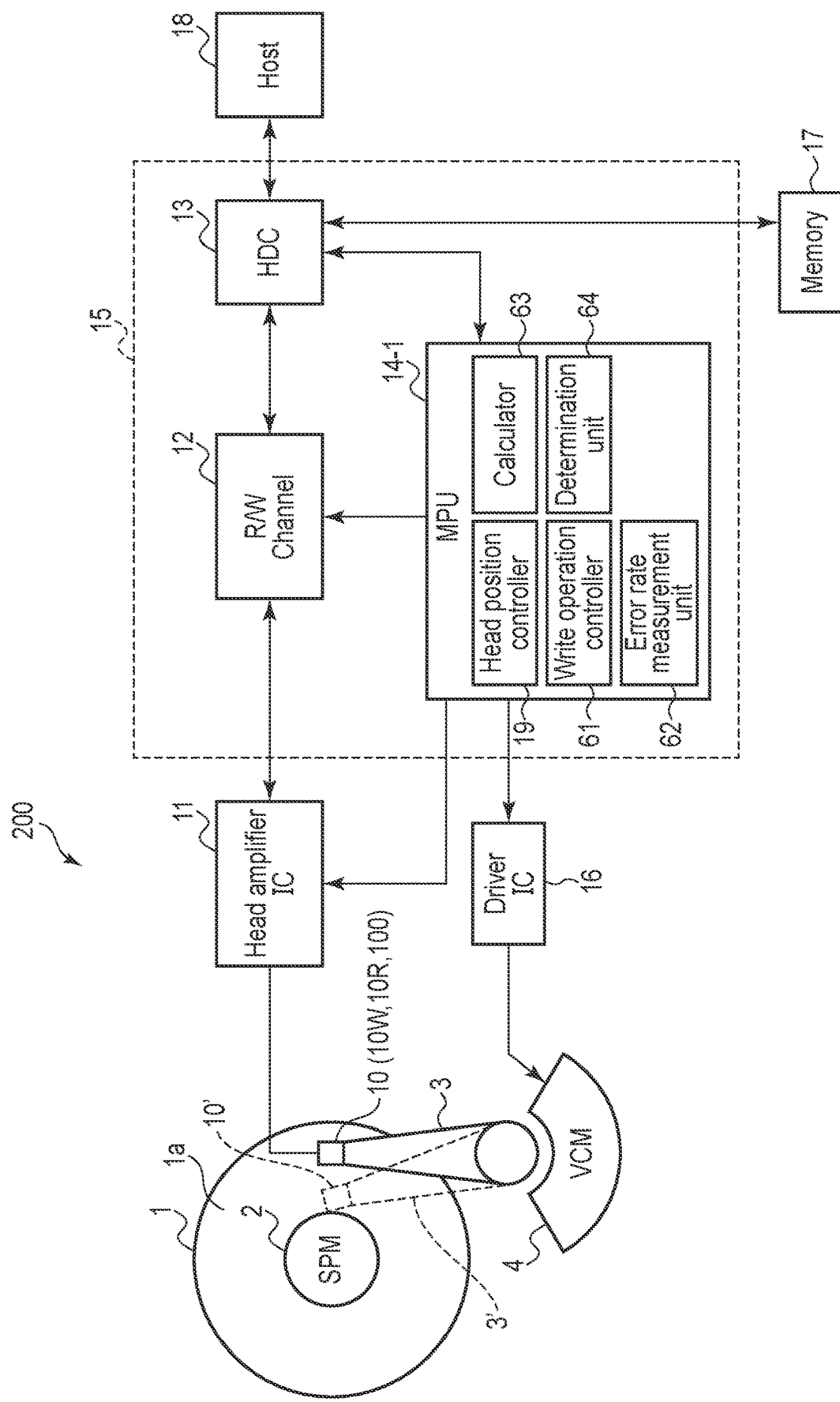
F I G. 1

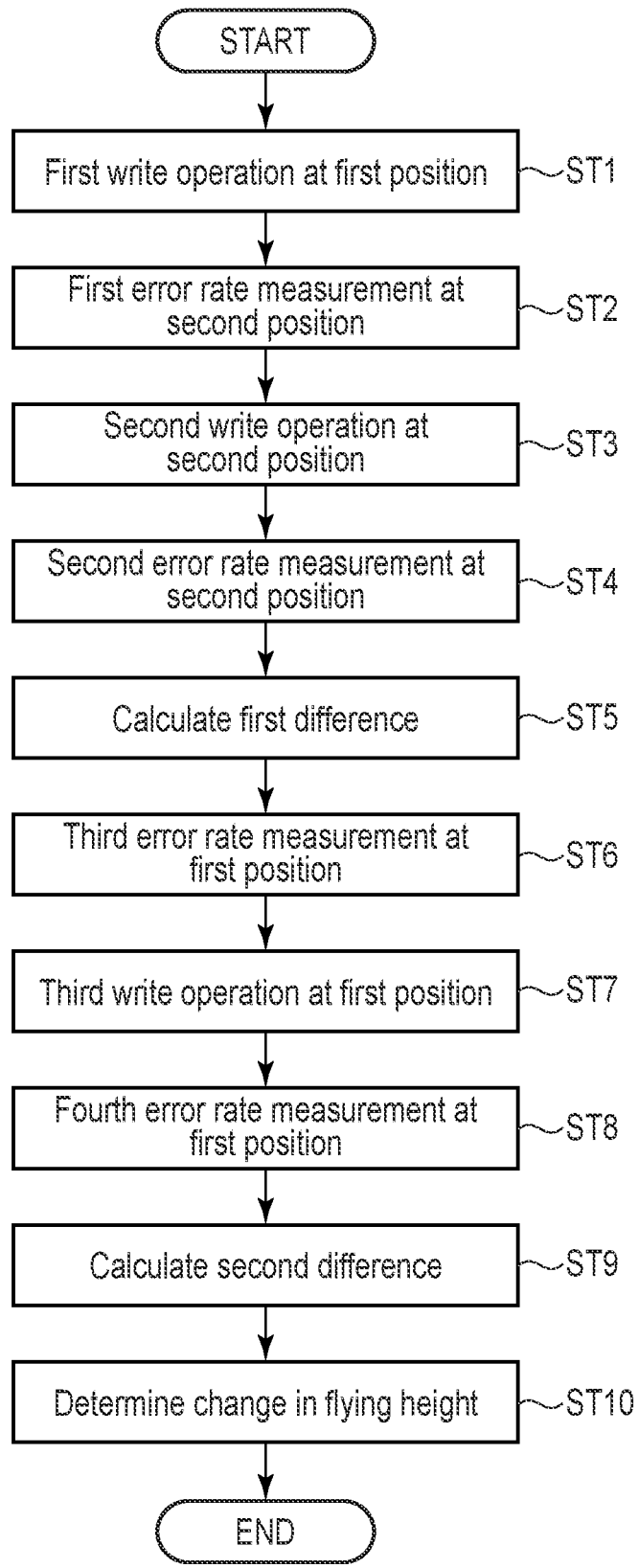
F I G. 5

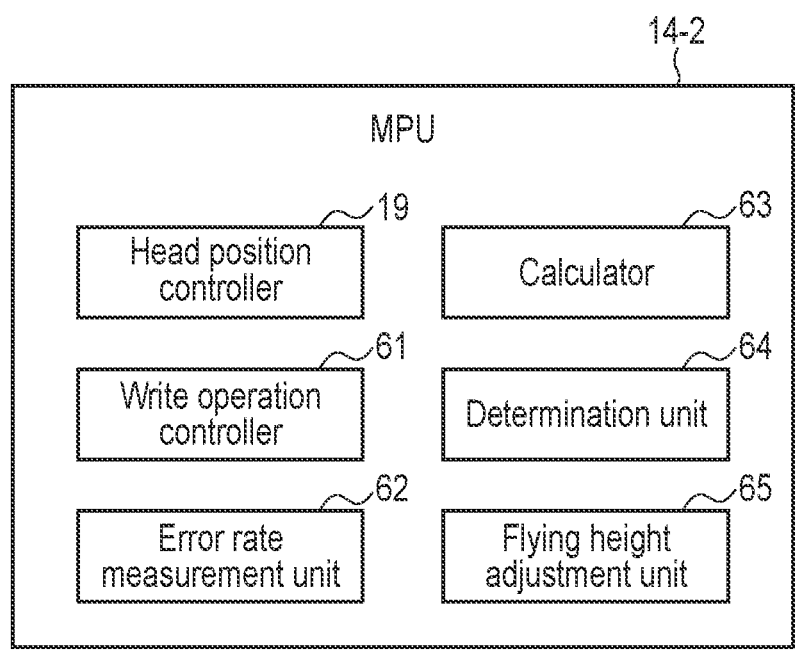
F I G. 8

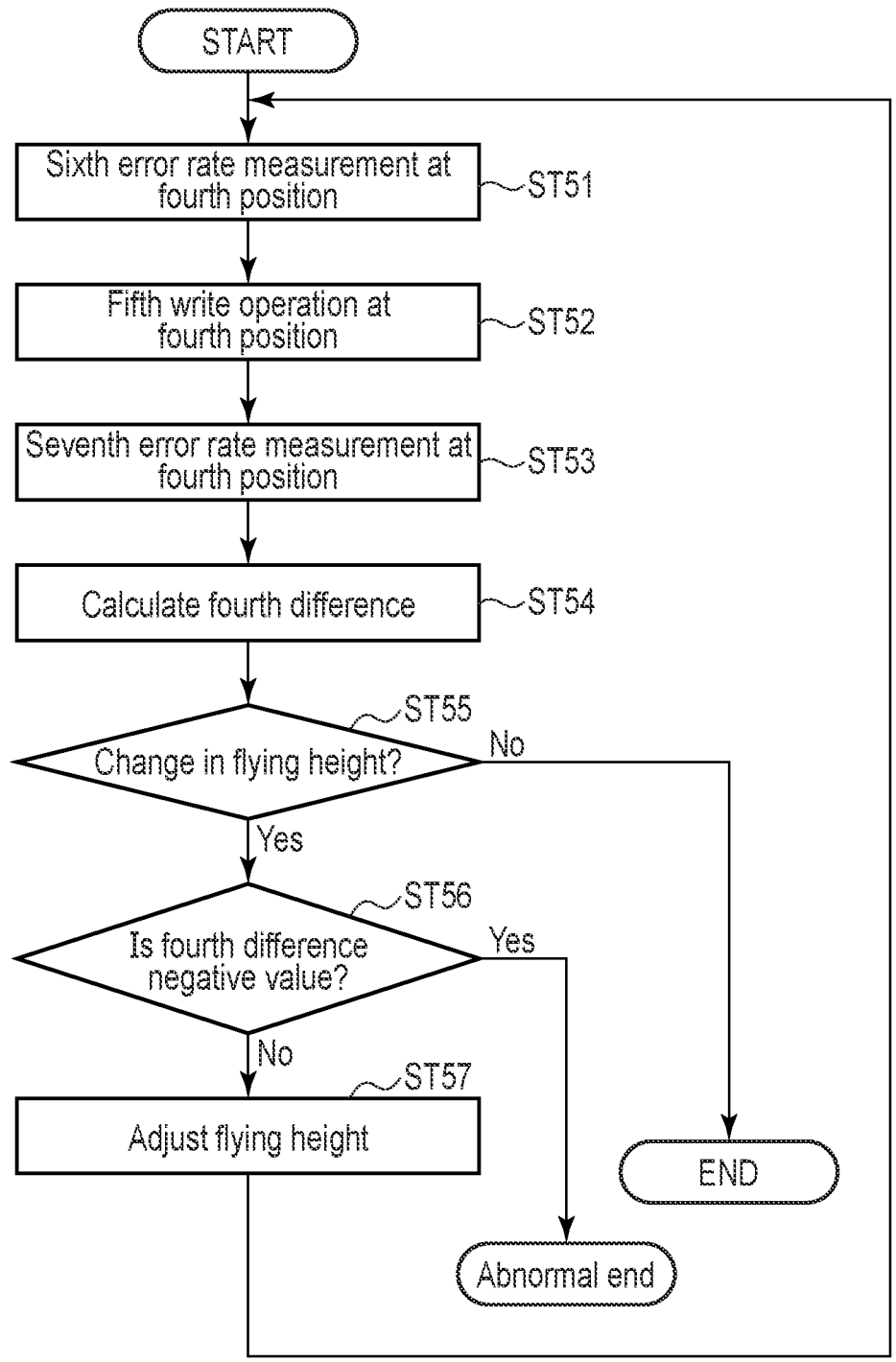
F I G. 11

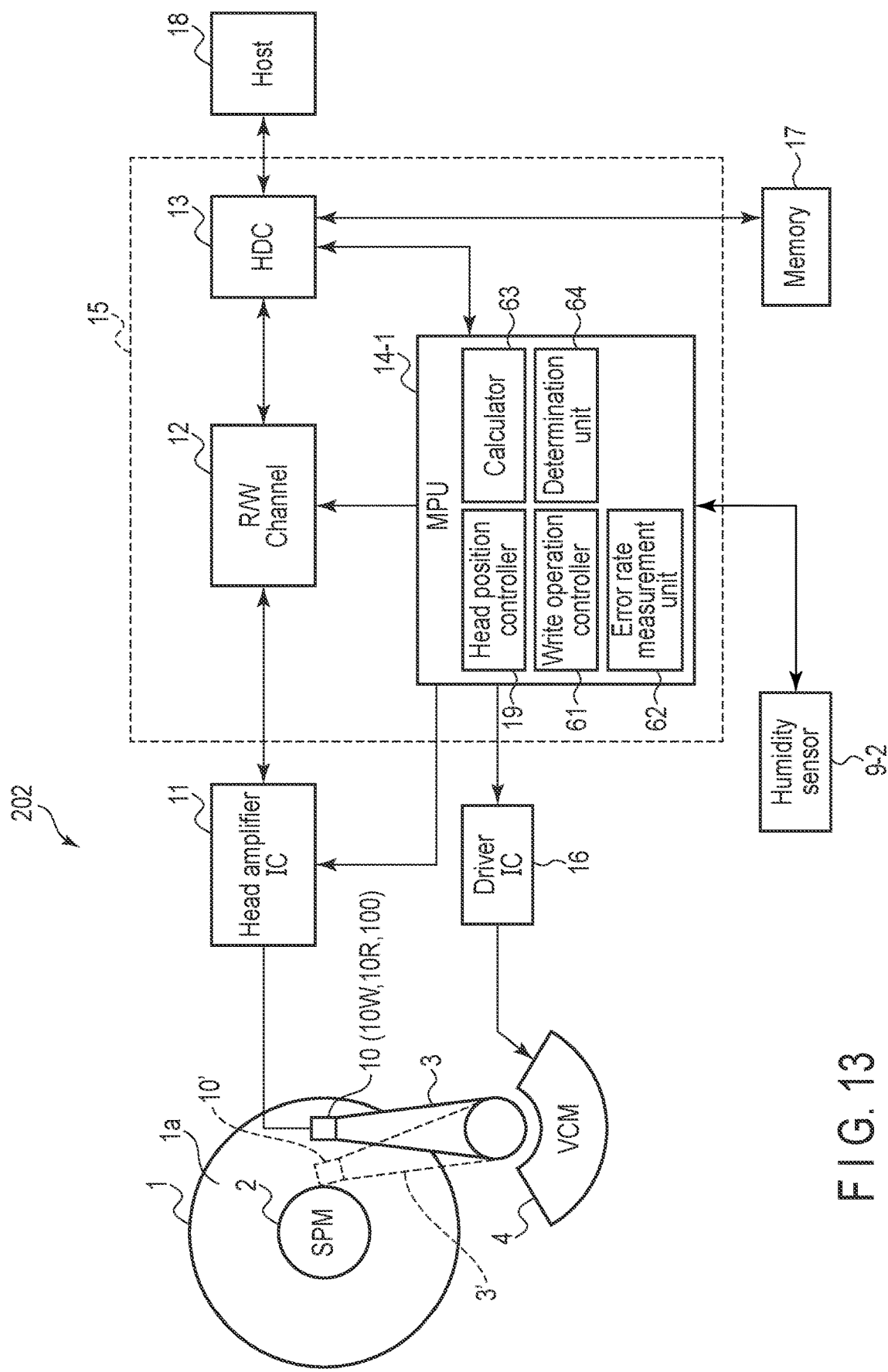
F I G. 13

MAGNETIC RECORDING AND REPRODUCING DEVICE AND ADJUSTMENT METHOD OF THE SAME

CROSS-REFERENCE TO RELATED APPLICATIONS

This application is based upon and claims the benefit of priority from Japanese Patent Application No. 2023-158269, filed Sep. 22, 2023, the entire contents of which are incorporated herein by reference.

FIELD

Embodiments described herein relate generally to a magnetic recording and reproducing device and an adjustment method of the same.

BACKGROUND

In a heat-assisted magnetic recording head, the temperature of a magnetic disk is raised for recording by laser. It is known that, at this time, components considered to originate from a magnetic film of the magnetic disk adhere to a tip of a near-field transducer (NFT) via a lubricant and generate a cured material, due to the temperature rise.

The generation of the lubricant-cured material cannot be prevented on the principle of recording. In contrast, it is known that when the lubricant-cured material adheres, the transmittance of the laser is increased and the material acts as a layer which improves a transmission efficiency of the laser.

The lubricant-cured material is scraped off by wear if a flying height is lowered, or is built up again by the lubricant filling a head-media interface if the flying is increased. For this reason, a problem arises that when the flying height fluctuates within a disk surface, for example, when the head moves from a track with a low fly to a track with a high fly, the write performance is degraded until the lubricant-cured material is generated.

In addition, with regard to adjustment of the flying height of the write head and NFT, the accuracy of adjustment of the flying height has conventionally been inferior to that of a read head. Therefore, it is desired to adjust the flying height for the write head so as to make no difference in error rate immediately after seek and after sufficient write.

Furthermore, it is also desired to adjust the flying height when the temperature changes or when the flying at the user's site is monitored.

BRIEF DESCRIPTION OF THE DRAWINGS

FIG. 1 is a block diagram showing an example configuration of a magnetic recording and reproducing device according to a second embodiment.

FIG. 5 is a flowchart showing an example of an adjustment method of a magnetic recording and reproducing device according to a first embodiment.

FIG. 8 is a block diagram showing another example of MPU of FIG. 5.

FIG. 11 is a flowchart showing another example of the method of adjusting the magnetic recording and reproducing device according to the first embodiment.

FIG. 13 is a block diagram showing an example configuration of another magnetic recording and reproducing device according to a second embodiment.

DETAILED DESCRIPTION

Figure 2:
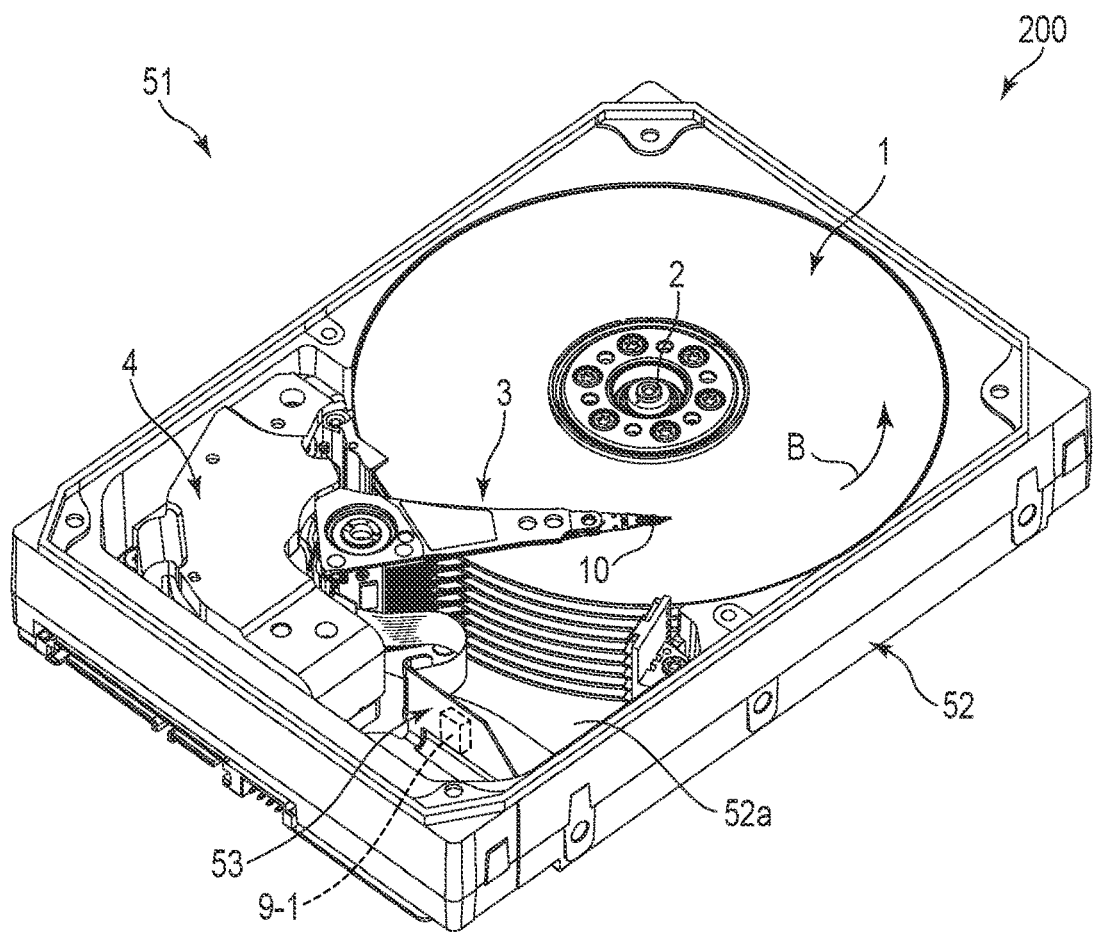
FIG. 2 is a partially exploded perspective view showing the magnetic recording and reproducing device according to the second embodiment.

In general, according to one embodiment, a method of adjusting a magnetic recording and reproducing device according to a first embodiment is a method of adjusting a magnetic recording and reproducing device incorporating a heat-assisted magnetic recording head and a magnetic disk, and the method includes performing a first write operation at a first position on a recording surface of the magnetic disk by the heat-assisted magnetic recording head, seeking the heat-assisted magnetic recording head to a second position different in radial position from the first position and measuring a first error rate, performing a second write operation at a second position and then measuring a second error rate, obtaining a first difference between the first error rate and the second error rate, seeking the heat-assisted magnetic recording head to the first position and measuring a third error rate, performing a third write operation at the first position and then measuring a fourth error rate, obtaining a second difference between the third error rate and the fourth error rate, comparing the first difference with the second difference and determining a change in flying height.

A magnetic recording and reproducing device according to a second embodiment is an example of a device performing the method of adjusting the magnetic recording and reproducing device according to the first embodiment, and includes a magnetic disk including a magnetic recording layer and a lubricant provided on a recording surface of the magnetic recording layer, a heat-assisted magnetic recording head performing magnetic recording on the magnetic disk, a head position controller arranging the heat-assisted magnetic recording head at a first position on the recording surface or a second position whose radial position is different from the first position, a write operation controller controlling each of a first write operation at the first position, a second write operation at the second position, and a third write operation at the first position, an error rate measurement unit measuring a first error rate before the second write operation, a second error rate after the second write operation, a third error rate before the third write operation, and a fourth error rate after the third write operation, a calculator obtaining each of a first difference between the first error rate and the second error rate and a second difference between the third error rate and the fourth error rate, and a determination unit comparing the first and second differences and determining the change in flying height.

According to the first embodiment and the second embodiment, the change in flying height of the heat-assisted magnetic recording head can be determined by obtaining and comparing the error rates before and after the write operation at two or more positions different in radial position. In addition, the flying height of the heat-assisted magnetic recording head can be adjusted based on the obtained differences and the change in flying height.

EXAMPLES

Example 1

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by the same reference numerals and their detailed descriptions may be omitted unless necessary.

First, an example configuration of a disk drive according to a second embodiment will be described with reference to FIG. 1. Incidentally, the configuration of the disk drive shown in FIG. 1, which is a magnetic recording and reproducing device, is also applicable to each of the embodiments described below.

As shown in FIG. 1, a disk drive 200 is a magnetic disk drive of a perpendicular magnetic recording scheme, incorporating a magnetic disk 1 that is a perpendicular magnetic recording medium and a magnetic head 10 including a magnetic flux control layer to be described later.

FIG. 2 is a partially exploded perspective view showing the magnetic recording and reproducing device according to the second embodiment.

FIG. 2 illustrates a state in which a plurality of magnetic disks 1 and a plurality of magnetic heads 10 are housed in a housing 51 in the magnetic recording and reproducing device according to the second embodiment, and a lid portion is omitted.

The magnetic disks 1 are fixed to a spindle motor (SPM) 2 and mounted to make rotational motion. The magnetic heads 10 are mounted on an actuator 3 and are configured to move in a radial direction on the magnetic disks 1. The actuator 3 is driven to rotate by a voice coil motor (VCM) 4. In FIG. 1, for example, it can be shown that the magnetic head 1 is sought at a first position on a recording surface 1a and that a magnetic head 10' mounted on an actuator 3' is sought at a second position whose radial position is different from the first position. The magnetic head 10 comprises a write head 10W, a read head 10R, and a thermal assist unit 100. The write head 10W writes data to the magnetic disk 1. The read head 10R reads data from the magnetic disk 1. The thermal assist unit 100 assists in writing data when the write head 10W writes data to the magnetic disk 1. The magnetic head 10 can include one or more magnetic heads.

Furthermore, the disk drive includes a head amplifier integrated circuit (hereinafter referred to as a head amplifier IC) 11, a read/write channel (R/W channel) 12, a hard disk controller (HDC) 13, a microprocessor (MPU) 14-1, a driver IC 16, and a memory 17. The R/W channel 12, the HDC 13, and the MPU 14 are incorporated into a controller 15, which consists of a single-chip integrated circuit.

The head amplifier IC 11 includes a circuit group for driving a laser diode for thermal assist, as described below. Furthermore, the head amplifier IC 11 includes a driver that supplies to the recording head 10W a recording signal (write current) corresponding to the write data supplied from the R/W channel 12. In addition, the head amplifier IC 11 also includes a read amplifier that amplifies the read signal output from the reproducing head 10R and transmits the read signal to the R/W channel 12.

The R/W channel 12 is a signal processing circuit of the read/write data. The HDC 13 constitutes an interface between the disk drive and a host 18, and executes transfer control of the read/write data.

The MPU 14 is a main write operation control unit of the disk drive and executes servo control necessary for controlling read/write operations and positioning the magnetic head 10. Furthermore, the MPU 14 includes a head position controller 19 that arranges the heat-assisted magnetic recording head 10 at a first position on the recording surface or a second position whose radial position is different from the first position, a write operation controller 61 that controls each of a first write operation at the first position, a second write operation at the second position, and a third write operation at the first position, an error rate measurement unit 62 that measures a first error rate before the second write operation, a second error rate after the second write operation, a third error rate before the third write operation, and a fourth error rate after the third write operation, a calculator 63 that obtains each of a first difference between the first error rate and the second error rate and a second difference between the third error rate and the fourth error rate, and a determination unit 64 that compares the first and second differences to determine the change in flying height.

The memory 17 includes a buffer memory composed of DRAM, a flash memory and the like.

A temperature sensor 9-1 can be installed in an open space on a bottom wall 52a of a base 52, for example, between a board unit (FPC unit) 53 on which electronic components such as conversion connectors are mounted and the magnetic disks 1, and can be provided optionally as desired.

Figure 3:
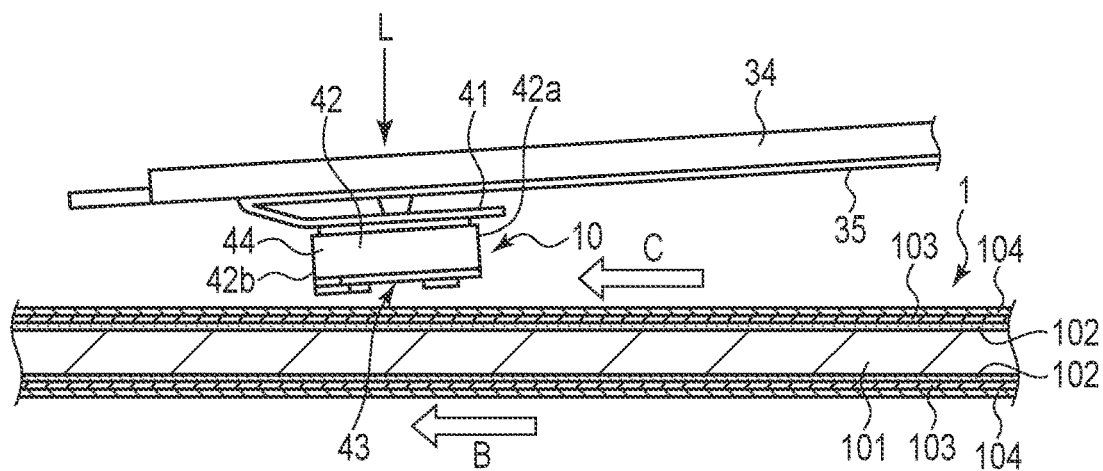
FIG. 3 is a side view showing a magnetic head and a suspension.

FIG. 3 is a side view showing the magnetic head 10 and a suspension.

As shown in FIG. 3, each magnetic head 10 is constituted as a flying head, and includes a slider 42 having a shape of a substantially rectangular parallelepiped and a recording and reproducing head unit 44 provided at an outflow end (trailing end) of the slider 42. The magnetic head 10 is secured to a gimbal spring 41 provided at an end portion of a suspension 34. A head load L toward the surface of the magnetic disk 1 is applied to each magnetic head 10 by the elasticity of the suspension 34. As shown in FIG. 2, each magnetic head 10 is connected to a head amplifier IC 11 and an HDC 13 via the suspension 34 and a wiring member (flexure) 35 fixed on the arm.

Next, the structure of the magnetic disk 1 and the magnetic head 10 will be described in detail.

Figure 4:
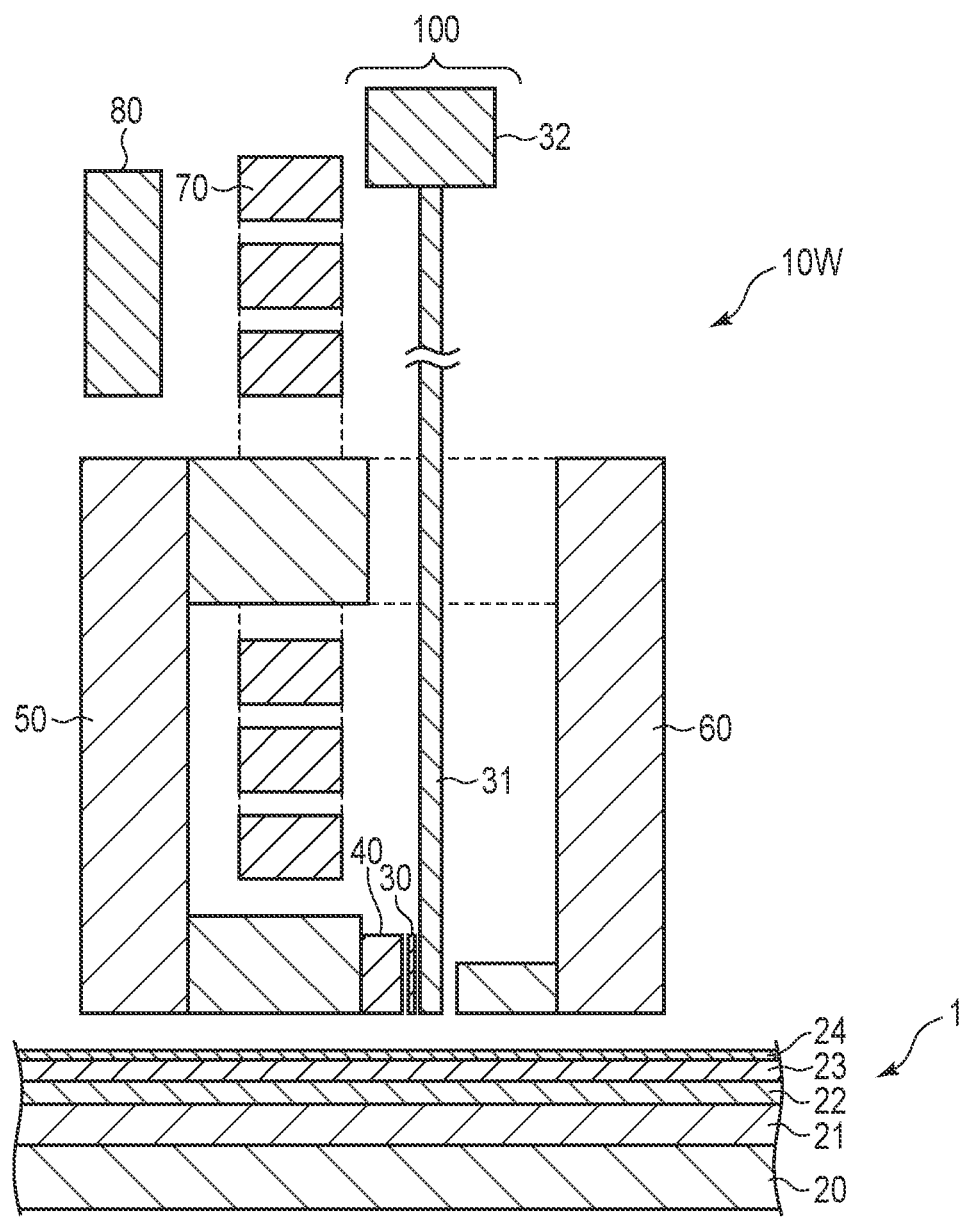
FIG. 4 is a partially transverse cross-sectional view showing the magnetic recording and reproducing device according to the second embodiment.

FIG. 4 is a transverse cross-sectional view showing the write head 10W and magnetic disk 1, which are parts of the magnetic disk drive.

The magnetic disk 1 includes a substrate 20, a heat sink layer 21, a crystal orientation layer 22, a perpendicular recording layer 23, and a protective film 24 having a surface coated with a lubricant, which are stacked in order on the substrate 20. The perpendicular recording layer 23 has a large anisotropy perpendicular to the disk surface. The crystal orientation layer 22 is arranged under the perpendicular recording layer 23 to improve the orientation of that perpendicular recording layer 23. The heat sink layer 21 is arranged under the crystal orientation layer 22 to suppress the spread of the heating area. The protective film 24 is arranged on an upper part of the perpendicular recording layer 23 to protect the perpendicular recording layer 23.

The magnetic head 10 is a separated magnetic head in which the recording head 10W and the reproducing head 10R are separated, and the recording head 10W is composed of a main magnetic pole 40 formed of a high permeability material that generates a magnetic field perpendicular to the disk surface, a trailing yoke 50 magnetically bonded to the main magnetic pole that flows a magnetic flux to the main magnetic pole 40, a return shield magnetic pole 60 provided to efficiently close a magnetic path directly under the main magnetic pole, which is arranged on a leading side of the main magnetic pole 40, a coil 70 arranged to wrap around the magnetic path including the trailing yoke and the return shield magnetic pole to pass the magnetic flux to the main magnetic pole 40, a heater 80 for controlling the height of flying of the recording head, a near-field transducer 30 that generates near-field light to heat the perpendicular recording layer 23 of the magnetic disk 1 on the leading side of the main magnetic pole 40, and a waveguide 31 that propagates the light for generating the near-field light. A light source is incorporated such that a laser diode 32 is mounted on a slider of the actuator assembly 3. The near-field transducer 30 can be formed of, for example, Au, Pd, Pt, Rh, or Ir, or an alloy consisting of a combination of some of these. An insulating layer between the main magnetic pole and the near-field transducer can be formed of, for example, an oxide of $SiO_2$, $Al_2O_3$, or the like.

Recording methods for heat-assisted magnetic recording that can be used in the magnetic disk device 200 include so-called Conventional Magnetic Recording (CMR) for writing data in tracks at intervals in the radial direction and performing recording such that adjacent tracks do not overlap, so-called Shingled Magnetic Recording (SMR) including tracks stacked in order in the radial direction and recording over parts of the adjacent tracks, or so-called Interlaced Magnetic Recording (IMR) including a bottom track and a top track in which adjacent tracks are stacked alternately and, after recording on the bottom track, recording while stacking the bottom track on the interlaced top track, or a combination of these methods.

FIG. 5 is a flowchart showing an example of an adjustment method using the magnetic recording and reproducing device according to the first embodiment shown in FIG. 1.

Example 1 shows an example of comparing flying heights between two positions different in radial position, as an example of the adjustment method using the magnetic recording and reproducing device according to the first embodiment.

As shown in the flowchart, the method of adjusting the magnetic recording and reproducing device is started, the heat-assisted magnetic recording head 10 is first controlled by the write operation controller 61 to perform the first write operation (ST1), at the first position on the recording surface of the magnetic disk, and a lubricant-cured material is thereby formed. Next, the heat-assisted magnetic recording head 10 is controlled by the head position controller 19 to seek to the second position whose radial position is different from the first position on the recording surface and measure the first error rate by the error rate measurement unit 62 (ST2). Then, the heat-assisted magnetic recording head is controlled by the write operation controller 61 to perform a second write operation at the second position (ST3), and a lubricant-cured material is thereby formed. After that, the second error rate is measured at the second position by the error rate measurement unit 62 (ST4), and a first difference between the first error rate and the second error rate is obtained by the calculator 63 (ST5). Then, the heat-assisted magnetic recording head 10 is controlled by the head position controller 19 to seek to the first position, and the third error rate is measured by the error rate measurement unit 62 (ST6). Then, the heat-assisted magnetic recording head 10 is controlled by the write operation controller 61 to perform a third write operation at the first position (ST7), and a lubricant-cured material is thereby formed. After that, the fourth error rate is measured at the first position by the error rate measurement unit 62 (ST8), and a second difference between the third error rate and the fourth error rate is obtained by the calculator 63 (ST9). Then, the first difference and the second difference are compared by the determination unit 64 to determine the change in flying height (ST10), and the process ends. Flying between two different positions is thereby compared.

The lower of the absolute value of the first difference and the absolute value of the second difference can be determined as the absolute value for lower flying.

In this case, the radial position can be determined by the distance to the center of the recording surface 1a of the magnetic disk 1. For example, the second position whose radial position is different from the first position means that when the first position is located concentrically in a first distance with respect to the center of the recording surface 1a of the magnetic disk 1, the second position is located concentrically in a second distance different from the first distance with respect to the center of the recording surface 1a.

In addition, the write operations such as the first write operation, the second write operation, and the third write operation can write continuously for a predetermined time, for example, a time sufficient to form a lubricant-cured material. The predetermined time of the write operations can be determined by the time for which the difference in error rate disappears. For example, the predetermined time can be set to one to three seconds. For example, the predetermined time can be set to the same time for the first write operation, the second write operation, and the third write operation.

In the measurement of error rates such as the first error rate, the second error rate, the third error rate, and the fourth error rate, the data for measuring the error rates can be written and reproduced.

Figure 6:
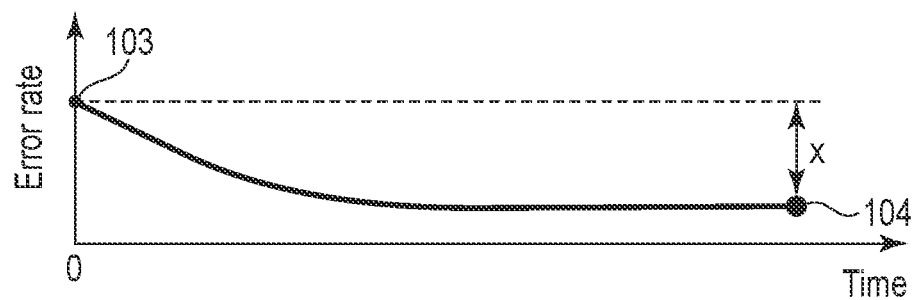
FIG. 6 is a graph showing a relationship between a predetermined time and an error rate in a write operation at a second position.

FIG. 6 is a graph showing a relationship between the predetermined time and the error rate of the write operation at the second position.

In the graph, measurement point 101 indicates the first error rate at the second position, which is measured before the write operation by ST2 (represented by predetermined time 0). Measurement point 102 indicates the second error rate measured by ST4 after the second write operation is performed at the second position for a predetermined time by ST3. As shown in the graph, it can be understood that the first difference between the first error rate and the second error rate is zero since the first error rate and the second error rate are the same value.

Figure 7:
FIG. 7 is a graph showing a relationship between a predetermined time and an error rate in a write operation at a first position.

In addition, FIG. 7 is a graph showing a relationship between the predetermined time and the error rate of the write operation at the first position.

In the graph, measurement point 103 indicates the third error rate measured before the write operation at the first position by ST6 (represented by predetermined time 0), and measurement point 104 indicates the fourth error rate measured by ST8 after the third write operation is performed at the first position for a predetermined time by ST7. As shown in the graph, it can be understood that the fourth error rate is lower than the third error rate by x and that the second difference between the third and the fourth error rate at the first position is x.

As shown in FIG. 6 and FIG. 7, it can be determined that the first difference at the second position has lower flying since the absolute value of the first difference zero is lower than the absolute value of the second difference x.

According to the embodiment, by measuring the error rates before and after the write operation at two or more positions with different radial positions of the recording surface 1a and calculating and comparing the differences, it is possible to determine the change in the flying height based on the formation of lubricant-cured material can be determined and, if there is a change in the flying height, determine which flying height needs to be used as a reference flying height.

For example, it is possible to determine the change in the flying height at three positions different in radial position. In this case, after obtaining the second difference in the method of adjusting the magnetic recording and reproducing device according to the first embodiment, the heat-assisted magnetic recording head 10 is controlled by the head position controller 19 to seek to the third position whose radial position is different from the first and second positions, and the fifth error rate is measured by the error rate measurement unit 62. Then, after the heat-assisted magnetic recording head 10 is controlled by the write operation controller 61 to perform a fourth write operation at the third position, the sixth error rate is measured by the error rate measurement unit 62. After that, the method can further include obtaining the third difference between the fifth error rate and the sixth error rate by the calculator 63, comparing the first difference, the second difference, and the third difference by the determination unit 64, and determining the change in the flying height.

In addition, the flying height can be adjusted such that no difference in error rate is made at two or more positions whose radial positions are different. The heights of the lubricant-cured materials can be made equivalent at two or more positions different whose radial positions are different.

In the method of adjusting the magnetic recording and reproducing device according to the first embodiment, it is further possible to perform the write operation again at arbitrary timing, measure the error rates before and after the write operation, and obtain the difference in error rate for comparison and determination.

Such timing can be set freely, for example, before shipment after manufacturing, after shipment, at regular intervals, at the time when the temperature changes, at the time when the humidity changes, or the like.

In addition, it is possible to measure the error rates before and after the write operation, calculate and compare the difference, and thereby monitor the change in the flying height, if necessary, after shipment, for example, at the user's site. Furthermore, it is possible to optionally adjust the flying height according to the change in flying height. Such monitoring of the change in flying height can be performed in the background in a state in which the magnetic recording and reproducing device 200 is not performing recording and reproducing operations. A user area on the recording surface can be used as the position where the write operation is performed or a test cylinder can be provided for testing.

In addition, when the change in flying height is determined, the host 18 can be notified of the change. At this time, the host 18 can be notified of the change using Self-Monitoring Analysis and Reporting Technology (SMART) function.

A perpendicular magnetic recording medium can be used for the magnetic disk 1 included in the magnetic recording and reproducing device 200 according to the embodiment. The perpendicular magnetic recording medium can include, for example, a magnetic recording layer having a granular structure. Magnetic particles having $L1_0$ structure are contained as the magnetic material, as the magnetic material, in the magnetic recording layer of the granular structure. Examples of the magnetic particles having the $L1_0$ structure include FePt alloy particles, CoPt alloy particles, and the like. C, BN, an oxide containing $SiO_2$ and the like can be contained as grain boundary, as grain boundary materials. The lubricant-cured material is considered to be a cured material formed when components originating from the magnetic recording layer, such as $SiO_2$ contained in the grain boundary, adhere to the tip of NFT via the lubricant. In addition, a protective layer can be provided on the magnetic recording layer. For example, carbon (C), diamond-like carbon, $SiO_2$, $ZrO_2$, and the like can be used as the protective layer. For example, perfluoropolyether, fluorinated alcohol, fluorinated carboxylic acid, and the like, can be used as the lubricants applied to the recording surface of the magnetic disks.

Example 2

Example 2 shows an example of adjusting the flying height based on the determination result of the change in flying height, as another example of the method of adjusting the magnetic recording and reproducing device according to the first embodiment.

FIG. 8 shows an example of an MPU used in another example of the magnetic recording and reproducing device of the second embodiment.

MPU 14-2 has the same configuration as the MPU 14-1 in FIG. 1, except for further including a flying height adjustment unit 65. In addition, the magnetic recording and reproducing device used in example 2 is another example of the magnetic recording and reproducing device according to the second embodiment, and has the same configuration as that in FIG. 1 except for employing the MPU 14-2 of FIG. 8 instead of the MPU 14-1.

Figure 9:
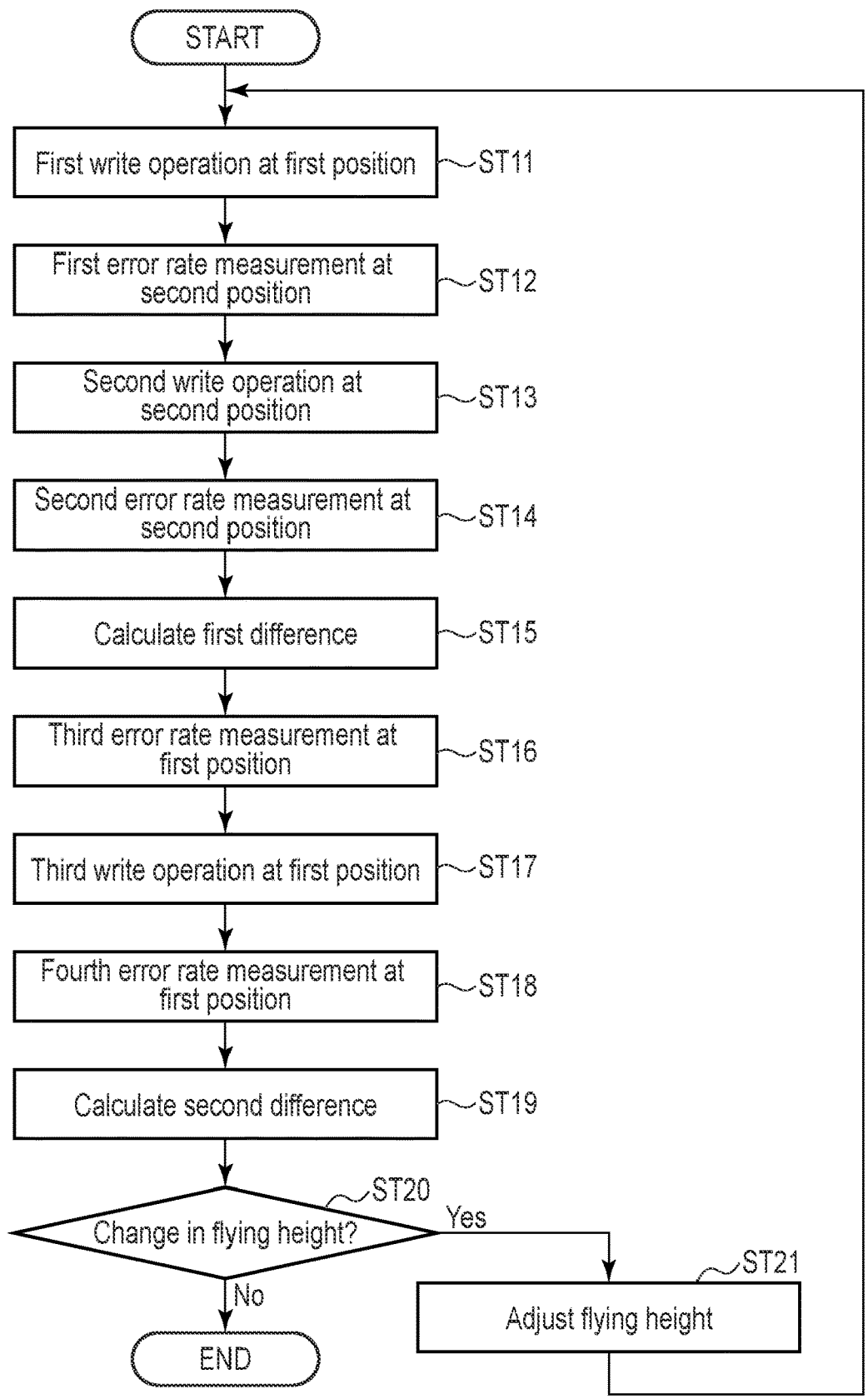
FIG. 9 is a flowchart showing another example of the method of adjusting the magnetic recording and reproducing device according to the first embodiment.

FIG. 9 is a flowchart showing another example of the method of adjusting the magnetic recording and reproducing device according to the first embodiment.

As shown in the flowchart, the adjustment of the magnetic recording and reproducing device is started, the heat-assisted magnetic recording head 10 is first controlled by the write operation controller 61 to perform the first write operation, at the first position on the recording surface 1a of the magnetic disk 1 (ST11), and a lubricant-cured material is thereby formed. Next, the heat-assisted magnetic recording head 10 is controlled by the head position controller 19 to seek to the second position whose radial position is different from the first position on the recording surface 1a and measure the first error rate by the error rate measurement unit 62 (ST12). Then, the heat-assisted magnetic recording head is controlled by the write operation controller 61 to perform a second write operation at the second position (ST13), and a lubricant-cured material is thereby formed. After that, the second error rate is measured at the second position by the error rate measurement unit 62 (ST14), and a first difference between the first error rate and the second error rate is obtained by the calculator 63 (ST15). Then, the heat-assisted magnetic recording head 10 is controlled by the head position controller 19 to seek to the first position, and the third error rate is measured by the error rate measurement unit 62 (ST16). Then, the heat-assisted magnetic recording head 10 is controlled by the write operation controller 61 to perform a third write operation at the first position (ST17), and a lubricant-cured material is thereby formed. After that, the fourth error rate is measured at the first position by the error rate measurement unit 62 (ST18), and a second difference between the third error rate and the fourth error rate is obtained by the calculator 63 (ST19). The processes from ST11 to ST19 are the same as the processes from ST1 to ST9 of the adjustment method of the example 1.

Next, the first difference and the second difference are compared by the determination unit 64 to determine the change in flying height (ST20). If there is the change in flying height, as a result of the determination, the flying height is adjusted by the flying height adjustment unit 65 (ST21) and then the processes from ST11 to ST20 are repeated. On the other hand, if there is no change in flying height, the adjustment is terminated. The comparison and adjustment of the flying height at two different positions can be thereby performed.

In addition, if the flying height changes, for example, the lower of the absolute value of the first difference and the absolute value of the second difference can be determined as the reference radial position. In the adjustment of the flying height, the flying height can be lowered until the difference in error rates for radial positions other than the reference radial position becomes the same as the difference in error rates for the reference radial position. The heights of the lubricant-cured materials at two positions can be thereby made equivalent.

Example 3

Example 3 shows an example of determining the change in flying height at three different radial positions, as another example of the method of adjusting the magnetic recording and reproducing device according to the first embodiment.

Figure 10:
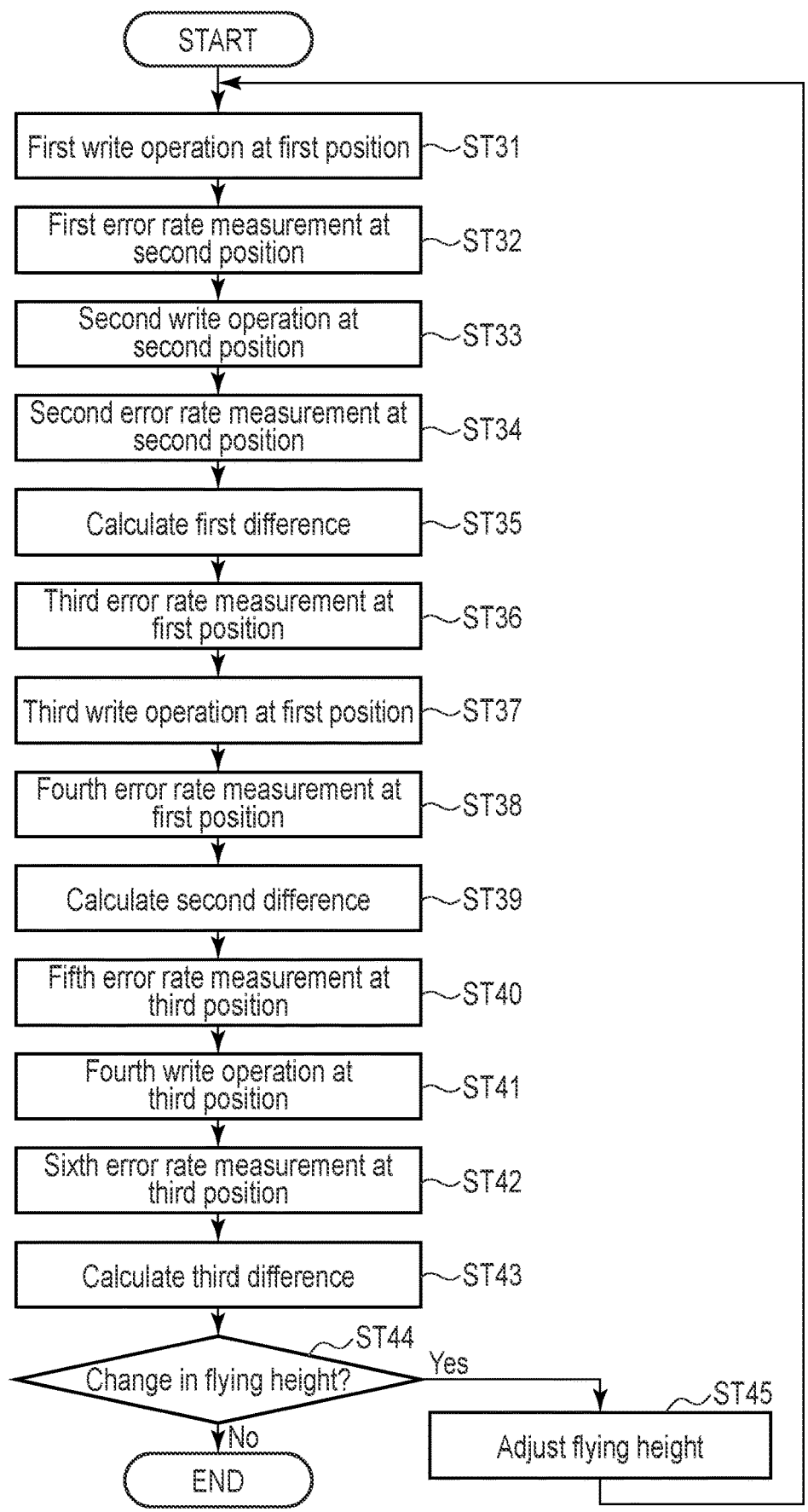
FIG. 10 is a flowchart showing another example of the method of adjusting the magnetic recording and reproducing device according to the first embodiment.

FIG. 10 is a flowchart showing yet another example of the method of adjusting the magnetic recording and reproducing device according to the first embodiment.

In this case, the same magnetic recording and reproducing device as that in example 2 can be used.

As shown in the flowchart, first, the adjustment of the magnetic recording and reproducing device is started, and the first difference and the second difference are obtained by ST31 to ST39 in the same manner as ST11 to ST19 in example 2.

Next, it is possible to control the heat-assisted magnetic recording head 10 by the head position controller 19 to seek to the third position whose radial position is different from the first and second positions, measure the fifth error rate by the error rate measurement unit 62 (ST40), control the heat-assisted magnetic recording head 10 to perform the fourth write operation at the third position by the write operation controller 61 (ST41), then measure the sixth error rate by the error rate measuring unit 62 (ST42), obtain the third difference between the fifth error rate and the sixth error rate by the calculator 63 (ST43), and compare the first difference, the second difference, and the third difference and determine the change in flying height by the determination unit 64 (ST44). The error rate measurement unit 62 measures the fifth error rate before the fourth write operation and the sixth error rate after the fourth write operation.

In addition, if there is the change in flying height, the flying height is adjusted by the flying height adjustment unit 65 (ST45), then the processes from ST31 to ST43 are repeated, as needed. On the other hand, if there is no change in flying height, the processes can be terminated. As a result, the comparison of the flying height between the three different positions and the adjustment are performed. In FIG. 10, after ST44, the adjustment of the flying height is performed in ST45 as needed, but it is possible to perform only the determination in ST44 and terminate the method of adjusting the magnetic recording and reproducing device.

If the flying height changes, for example, the lowest absolute value among the absolute value of the first difference, the absolute value of the second difference, and the absolute value of the third difference can be determined as the reference radial position. In the adjustment of the flying height, the flying height can be lowered until the difference in error rates for radial positions other than the reference radial position becomes the same as the difference in error rates for the reference radial position. The heights of the lubricant-cured materials at three positions can be thereby made equivalent.

Example 4

Example 4 shows an example of monitoring the change in flying height in the background, as yet another example of the method of adjusting the magnetic recording and reproducing device according to the first embodiment.

FIG. 11 is a flowchart showing yet another example of the method of adjusting the magnetic recording and reproducing device according to the first embodiment.

In this case, the same magnetic recording and reproducing device as that in example 2 can be used.

First, a magnetic recording and reproducing device in which the first difference and the second difference are obtained, comparison between the flying height between two positions is performed, and the flying height is adjusted as needed, is prepared in advance, similarly to example 2.

After performing the write operation in the user area, it is confirmed that the heat-assisted magnetic recording head is operable in the background, and monitoring the change in flying height is started. The state of being operable in the background means being operable in a situation which cannot be seen by the user, for example, being in an idle state.

First, the heat-assisted magnetic recording head 10 is controlled by the head position controller 19 to seek the heat-assisted magnetic recording head 10 to, for example, a position of a test cylinder, which is different in radial position from the first position and the second position, as a fourth position, and the sixth error rate is measured (ST51). Then, the heat-assisted magnetic recording head 10 is controlled by the write operation controller 61 to perform a fifth write operation at the fourth position (ST52), and a lubricant-cured material is thereby formed. After that, a seventh error rate is measured at the fourth position by the error rate measurement unit 62 (ST53). In other words, the sixth error rate before the fifth write operation and the seventh error rate after the fifth write operation are measured in the error rate measurement unit 62. Then, a fourth difference between the seventh error rate and the sixth error rate is obtained by the calculation section 63 (ST54).

Next, the fourth difference is compared with the first difference and/or the second difference obtained in advance to determine if there is a change in flying height, by the determination unit 64 (ST55).

If there is the change in flying height, it is determined whether the fourth difference is a negative value (ST56). If the fourth difference is a negative value, monitoring is terminated abnormally. If the fourth difference is not a negative value, the flying height is adjusted (ST57). After that, ST51 to 55 are repeated.

If there is no change in flying height, monitoring the change in flying height is terminated. In FIG. 11, the determination is performed in ST56 and the adjustment of the flying height is performed in ST57 as needed after ST55, but it is possible to perform only the determination in ST55 and terminate monitoring the change in flying height.

For example, the host 18 can be notified arbitrarily of each of the case of determining the change in flying height, the case of abnormally terminating the monitoring, and the case of terminating the monitoring. At this time, the SMART function can be used.

As a result, the changes in flying height of the magnetic recording and reproducing device can be automatically monitored in the background which cannot be seen by the user, for example, at any time before or after shipment.

The example in which a position is different in radial position from the first position and the second position as the fourth position, has been described with reference to FIG. 11, but the first position or the second position can be used as the fourth position.

Example 5

Example 5 shows an example of further performing comparison and determination at the timing of the change in temperature.

Figure 12:
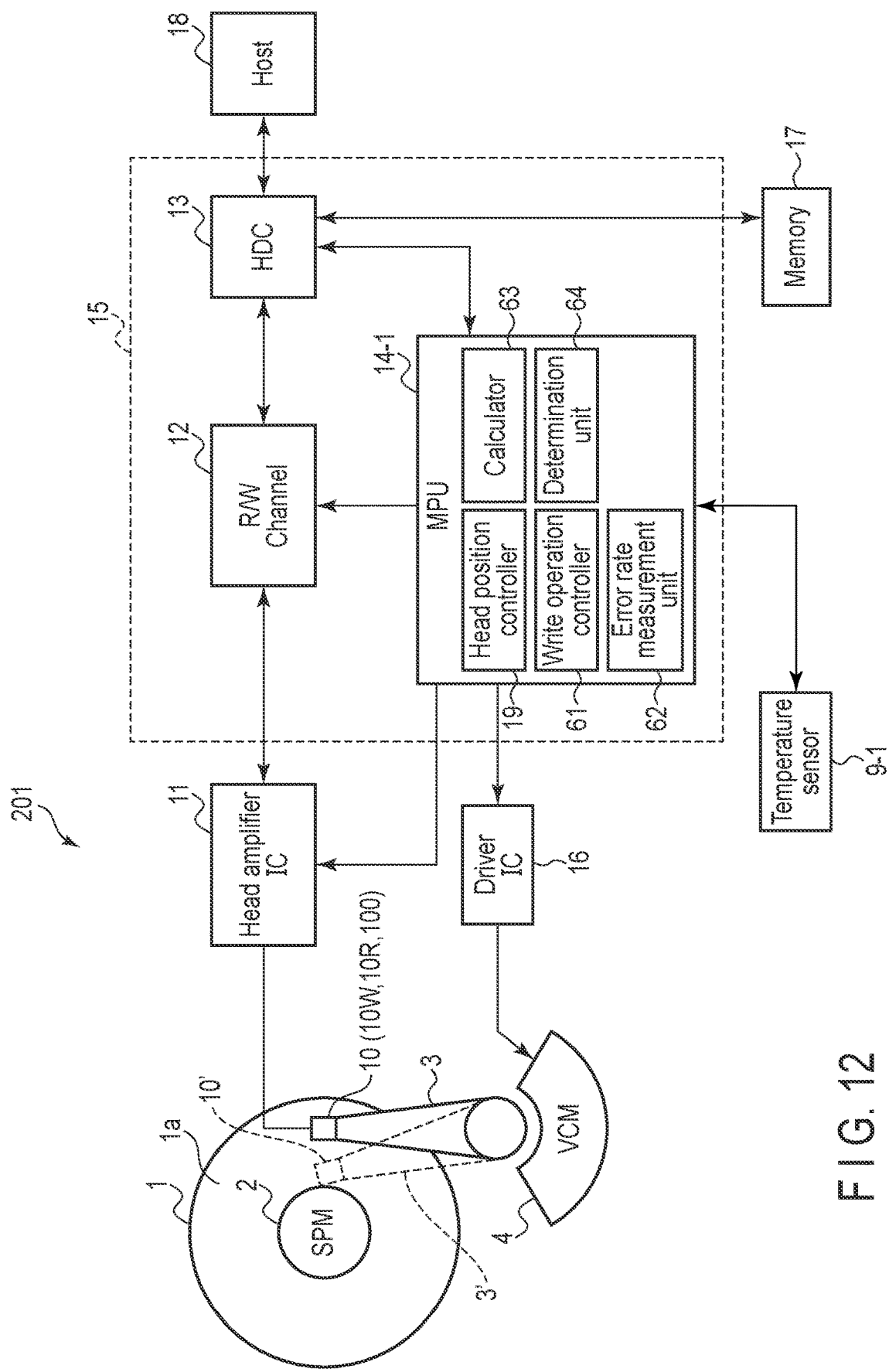
FIG. 12 is a block diagram showing an example configuration of another magnetic recording and reproducing device according to a second embodiment.

FIG. 12 is a block diagram showing yet another example of the configuration of the magnetic recording and reproducing device according to the second embodiment.

As shown in the drawing, a magnetic recording and reproducing device 201 is a magnetic recording and reproducing device used in example 5 and has the same configuration as that in FIG. 1 except that the temperature sensor 9-1 is further connected to the MPU 14-1.

The temperature sensor 9-1 is provided at any location in the magnetic disk drive to detect the temperature of the device atmosphere, as shown in FIG. 2.

In example 5, for example, the change in flying height between two or more positions different in radial position can be determined by the processes from ST51 to ST57 in FIG. 11, in the same manner as example 4, except for starting the comparison and determination of the change in flying height at the timing of determining that there is a change in temperature based on the temperature information from the temperature sensor 9-1, instead of starting the monitoring of the change in flying height at the timing of being operable in the background.

The temperature information from the temperature sensor 9-1 can be set to be acquired at regular intervals. A difference in temperature between the obtained temperature information can be determined by the calculator 63. The change in temperature can be determined based on the difference in temperature, by the determination unit 64.

Example 6

Example 6 shows an example of further performing the comparison and the determination at the timing when the humidity changes.

FIG. 13 is a block diagram showing yet another example of the configuration of the magnetic recording and reproducing device according to the second embodiment.

As shown in FIG. 13, a magnetic recording and reproducing device 202 has the same configuration as that in FIG. 1, except that a humidity sensor 9-2 is provided in the MPU 14-1.

The humidity sensor 9-2 is provided at any location in the magnetic disk drive to detect the humidity of the device atmosphere. In FIG. 2, the humidity sensor 9-2 is installed in an empty space on the bottom wall 52*a* of the base 52, for example, between the board unit (FPC unit) 53 on which electronic components such as conversion connectors are mounted and the magnetic disks 1, similarly to the temperature sensor 9-1. In addition, an air pressure sensor (not shown), and a temperature sensor similar to that shown in FIG. 10 can be further provided as needed.

In example 6, for example, the change in flying height between two or more positions different in radial position can be determined by the processes from ST51 to ST57 in FIG. 11, in the same manner as example 4, except for starting the comparison and determination of the change in flying height at the timing of determining that there is a change in humidity based on the humidity information from the humidity sensor 9-2, instead of starting the monitoring of the change in flying height at the timing of being operable in the background.

The humidity information from the humidity sensor 9-2 can be set to be acquired at regular intervals. A difference in temperature between the obtained humidity information can be determined by the calculator 63. The change in humidity can be determined based on the difference in humidity, by the determination unit 64.

Example 7

Example 7 shows an example of further performing the comparison and the determination at the timing when the air pressure changes.

Figure 14:
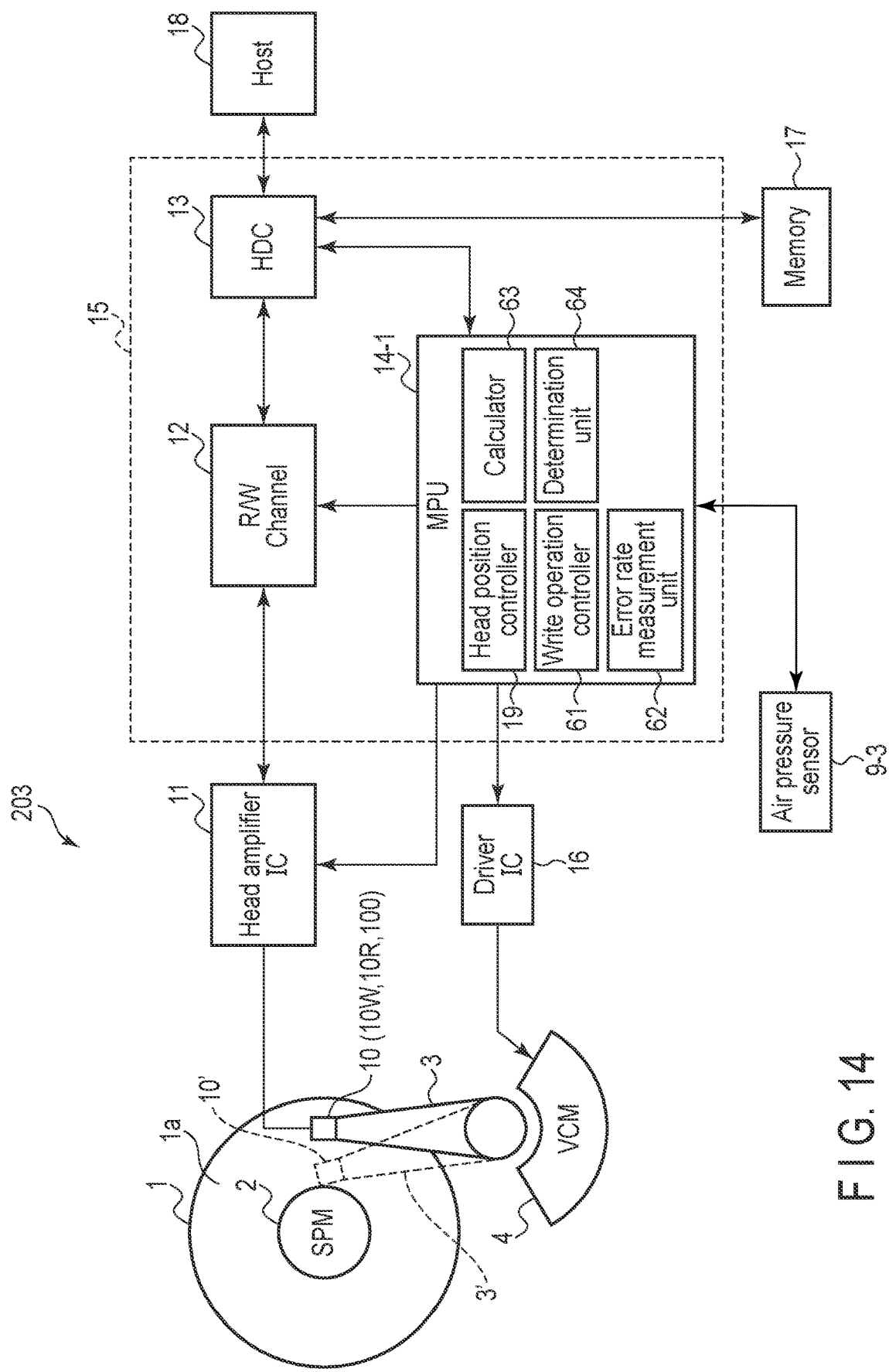
FIG. 14 is a block diagram showing an example configuration of another magnetic recording and reproducing device according to a second embodiment.

FIG. 14 is a block diagram showing yet another example of the configuration of the magnetic recording and reproducing device according to the second embodiment.

As shown in FIG. 14, the magnetic recording and reproducing device 203 has the same configuration as that in FIG. 1, except that an air pressure sensor 9-3 is provided in the MPU 14-1.

The air pressure sensor 9-3 is provided at any location in the magnetic disk drive to detect the air pressure of the device atmosphere. In FIG. 2, the air pressure sensor 9-3 is installed in an empty space on the bottom wall 52*a* of the base 52, for example, between the board unit (FPC unit) 53 on which electronic components such as conversion connectors are mounted and the magnetic disks 1, similarly to the temperature sensor 9-1. In addition, an air pressure sensor (not shown), and a temperature sensor similar to that shown in FIG. 10 can be further provided as needed.

In example 6, for example, the change in flying height between two or more positions different in radial position can be determined by the processes from ST51 to ST57 in FIG. 11, in the same manner as example 4, except for starting the comparison and determination of the change in flying height at the timing of determining that there is a change in air pressure based on the air pressure information from the air pressure sensor 9-3, instead of starting the monitoring of the change in flying height at the timing of being operable in the background.

The air pressure information from the air pressure sensor 9-3 can be set to be acquired at regular intervals. A difference in air pressure between the obtained air pressure information can be determined by the calculator 63. The change in air pressure can be determined based on the difference in air pressure, by the determination unit 64.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of adjusting a magnetic recording and reproducing device incorporating a heat-assisted magnetic recording head and a magnetic disk, the method comprising:
   performing a first write operation by the heat-assisted magnetic recording head, at a first position on a recording surface of the magnetic disk;
   seeking the heat-assisted magnetic recording head to a second position different in radial position from the first position on the recording surface, and measuring a first error rate;
   performing a second write operation at the second position and then measuring a second error rate at the second position;
   calculating a first difference between the first error rate and the second error rate;
   seeking the heat-assisted magnetic recording head to the first position and measuring a third error rate;
   performing a third write operation at the first position and then measuring a fourth error rate at the first position;
   calculating a second difference between the third error rate and the fourth error rate; and
   comparing the first difference with the second difference and determining a change in flying height between the first position and the second position.

2. The method of claim 1, further comprising:
   before determining the change in flying height,
   seeking the heat-assisted magnetic recording head to a third position different in radial position from the first position and the second position, and measuring a fifth error rate;
   performing a fourth write operation at the third position and then measuring a sixth error rate; and
   calculating a third difference between the fifth error rate and the sixth error rate, wherein
   the determining the change in flying height compares the first difference, the second difference, and the third difference, and determines the change in flying height at the first position, the second position, and third position.

3. The method of claim 1, further comprising:
   when a temperature in the magnetic recording and reproducing device changes,
   seeking the heat-assisted magnetic recording head to a fourth position different in radial position from the first position and the second position, and measuring a sixth error rate;
   performing a fifth write operation at the fourth position and then measuring a seventh error rate;
   calculating a fourth difference between the sixth error rate and the seventh error rate; and
   comparing the first difference and/or the second difference with the fourth difference and determining a change in flying height at the fourth position.

4. The method of claim 1, further comprising:
   when humidity in the magnetic recording and reproducing device changes,
   seeking the heat-assisted magnetic recording head to a fourth position different in radial position from the first position and the second position, and measuring a sixth error rate;
   performing a fifth write operation at the fourth position and then measuring a seventh error rate;
   calculating a fourth difference between the sixth error rate and the seventh error rate; and
   comparing the first difference and/or the second difference with the fourth difference and determining a change in flying height at the fourth position.

5. The method of claim 1, further comprising:
   when an air pressure in the magnetic recording and reproducing device changes,
   seeking the heat-assisted magnetic recording head to a fourth position different in radial position from the first position and the second position, and measuring a sixth error rate;
   performing a fifth write operation at the fourth position and then measuring a seventh error rate;
   calculating a fourth difference between the sixth error rate and the seventh error rate; and
   comparing the first difference and/or the second difference with the fourth difference and determining a change in flying height at the fourth position.

6. The method of claim 1, further comprising:
   when monitoring the magnetic recording and reproducing device in a background,
   seeking the heat-assisted magnetic recording head to a fourth position different in radial position from the first position and the second position, and measuring a sixth error rate;
   performing a fifth write operation at the fourth position and then measuring a seventh error rate;
   calculating a fourth difference between the sixth error rate and the seventh error rate; and
   comparing the first difference and/or the second difference with the fourth difference and determining a change in flying height at the fourth position.

7. The method of claim 1, further comprising:
   adjusting a flying height of the heat-assisted magnetic recording head when it is determined that there is a change in flying height as a result of the determination.

8. The method of claim 6, further comprising:
   notifying a host connected to an outside of the change in flying height when it is determined that there is a change in flying height as a result of the determination.

9. The method of claim 8, wherein
   notifying the host uses a SMART function.

10. A magnetic recording and reproducing device comprising:

a magnetic disk including a magnetic recording layer and a lubricant provided on a recording surface of the magnetic recording layer;
a heat-assisted magnetic recording head performing magnetic recording on the magnetic disk;
a head position controller arranging the heat-assisted magnetic recording head at a first position on the recording surface or a second position different in radial position from the first position;
a write operation controller controlling each of a first write operation at the first position, a second write operation at the second position, and a third write operation at the first position;
an error rate measurement unit measuring a first error rate before the second write operation, a second error rate after the second write operation, a third error rate before the third write operation, and a fourth error rate after the third write operation;
a calculator calculating each of a first difference between the first error rate and the second error rate and a second difference between the third error rate and the fourth error rate; and
a determination unit comparing the first difference with the second difference and determining a change in flying height.

11. The magnetic recording and reproducing device of claim 10, wherein
the head position controller further arranges the heat-assisted magnetic recording head to a third position different in radial position from the first position and the second position,
the write operation controller further controls a fourth write operation at the third position,
the error rate measurement unit further measures a fifth error rate before the fourth write operation and a sixth error rate after the fourth write operation,
the calculator further calculates a third difference between the fifth error rate and the sixth error rate, and
the determination unit further includes comparing the first difference, the second difference, and the third difference and determining the change in flying height.

12. The magnetic recording and reproducing device of claim 10, further comprising:
a temperature sensor, wherein
the head position controller seeks the heat-assisted magnetic recording head to a fourth position different in radial position from the first position and the second position,
the write operation controller performs a fifth write operation at the fourth position,
the error rate measurement unit measures a sixth error rate before the fifth write operation and a seventh error rate after the fifth write operation,
the calculator calculates a difference in temperature in the magnetic recording and reproducing device, based on temperature information from the temperature sensor, and obtains a fourth difference between the sixth error rate and the seventh error rate, and
the determination unit determines change in temperature, based on information on the difference in temperature, compares the first difference and/or the second difference with the fourth difference, and determines a change in flying height at the fourth position.

13. The magnetic recording and reproducing device of claim 10, further comprising:
a humidity sensor, wherein the head position controller seeks the heat-assisted magnetic recording head to a fourth position different in radial position from the first position and the second position,
the write operation controller performs a fifth write operation at the fourth position,
the error rate measurement unit measures a sixth error rate before the fifth write operation and a seventh error rate after the fifth write operation,
the calculator obtains a difference in humidity in the magnetic recording and reproducing device, based on humidity information from the humidity sensor, and obtains a fourth difference between the sixth error rate and the seventh error rate, and
the determination unit determines change in humidity, based on information on the difference in humidity, compares the first difference and/or the second difference with the fourth difference, and determines the change in flying height at the fourth position.

14. The magnetic recording and reproducing device of claim 10, further comprising:
an air pressure sensor, wherein
the head position controller seeks the heat-assisted magnetic recording head to a fourth position different in radial position from the first position and the second position,
the write operation controller performs a fifth write operation at the fourth position,
the error rate measurement unit measures a sixth error rate before the fifth write operation and a seventh error rate after the fifth write operation,
the calculator obtains a difference in air pressure in the magnetic recording and reproducing device, based on air pressure information from the air pressure sensor, and obtains a fourth difference between the sixth error rate and the seventh error rate, and
the determination unit determines change in air pressure, based on information on the difference in air pressure, compares the first difference and/or the second difference with the fourth difference, and determines the change in flying height at the fourth position.

15. The magnetic recording and reproducing device of claim 10, wherein
the heat-assisted magnetic recording head is operable in a background,
the head position controller seeks the heat-assisted magnetic recording head to a fourth position different in radial position from the first position and the second position,
the write operation controller performs a fifth write operation at the fourth position,
the error rate measurement unit measures a sixth error rate before the fifth write operation and a seventh error rate after the fifth write operation,
the calculator further calculates a fourth difference between the sixth error rate and the seventh error rate, and
the determination unit compares the first difference and/or the second difference with the fourth difference and determines a change in flying height at the fourth position.

16. The magnetic recording and reproducing device of claim 10, further comprising:
a flying height adjustment unit adjusting a flying height of the heat-assisted magnetic recording head, wherein
when it is determined that there is a change in flying height as a result of the determination, the flying height adjustment unit adjusts the flying height of the heat-assisted magnetic recording head.

17. The magnetic recording and reproducing device of claim 15, further comprising:
an external connection with a host, wherein
when it is determined that there is a change in flying height as a result of the determination, the host is notified of the change.

18. The magnetic recording and reproducing device of claim 17, wherein
notifying the host uses a SMART function.

* * * * *